United States Patent [19]
Johnson, Jr.

[11] Patent Number: 5,538,119
[45] Date of Patent: Jul. 23, 1996

[54] SYNCHRONIZING ARRANGEMENT WITH TORQUE LOCK FEATURE

[75] Inventor: Charles E. Johnson, Jr., Muncie, Ind.

[73] Assignee: Borg-Warner Automotive, Inc., Sterling Heights, Mich.

[21] Appl. No.: 355,662

[22] Filed: Dec. 14, 1994

[51] Int. Cl.$^6$ .............................. F16D 23/06; F16D 11/14
[52] U.S. Cl. .................. 192/53.34; 192/53.4; 192/108; 192/114 T
[58] Field of Search ................................ 192/114 T, 108, 192/53.34, 53, 341, 53,342, 53.343, 53.4, 69.9

[56] References Cited

U.S. PATENT DOCUMENTS

| | | | |
|---|---|---|---|
| 3,249,188 | 5/1966 | Maina | 192/108 X |
| 3,334,715 | 8/1967 | Bibbens | 192/114 T X |
| 4,817,773 | 4/1989 | Knodel et al. | |
| 4,905,806 | 3/1990 | Hillenbrand et al. | 192/108 X |
| 5,083,993 | 1/1992 | Oun | 475/299 |
| 5,211,068 | 5/1993 | Spitale et al. | 74/339 |

FOREIGN PATENT DOCUMENTS

| | | |
|---|---|---|
| 0195706 | 3/1986 | European Pat. Off. . |
| 2209196 | 8/1988 | United Kingdom . |

OTHER PUBLICATIONS

Copy of British Patent Office Report Under Section 17 on GB 9517873.7.
Socin & Walters Manual Transmission Synchronizers, SAE Paper No. 68008, published Jan. 1968.

*Primary Examiner*—Rodney H. Bonck
*Attorney, Agent, or Firm*—Reising, Ethington et al.; Greg Dziegielewski

[57] ABSTRACT

A gear transmission has a synchronizing arrangement associated with a helical gear that has end play. The synchronizing arrangement includes a shift sleeve having internal splines engageable with external teeth of a clutch gear that is an integral part of the helical gear. A torque lock feature is provided by cooperating back tapered torque lock surfaces of the splines and the external teeth of the clutch gear. The internal splines of the shift sleeve and the external teeth of the clutch gear are shaped to accommodate the end play of the helical gear and reduce variation in engagement of the torque lock surfaces.

14 Claims, 2 Drawing Sheets

SYNCHRONIZING ARRANGEMENT WITH TORQUE LOCK FEATURE

BACKGROUND OF THE INVENTION

This invention relates generally to synchronizing arrangements and more particularly to synchronizing arrangements that include a torque lock feature.

U.S. Pat. No. 5,083,993 issued to Michael Oun Jan. 28, 1992 discloses a synchronizing arrangement for a planetary gear comprising a shift sleeve, two synchronization rings and two coupling rings that are more commonly referred to as blocker rings and clutch gears. The shift sleeve has internal coupling teeth at each end. When the shift sleeve is actuated, these internal coupling teeth cooperate with external teeth of the respective synchronization rings to synchronize the speeds of the shift sleeve and one or the other of the coupling rings. The internal coupling teeth of the shift sleeve then engage external teeth of the coupling ring at synchronous speed to lock the shift sleeve (and the ring gear attached to it) to the coupling ring.

The outer axial ends of the internal coupling teeth have tips that are shaped with sharp edges at the apex of chamfered or oblique surfaces. These tips confront tips of like shape at the axial ends of the external teeth of the synchronization rings and the coupling rings as best shown in FIG. 2 of the patent. The tips of the internal coupling teeth cooperate with the confronting tips of the synchronization rings and the coupling rings to guide the internal coupling teeth of the shift sleeve past the external teeth of the synchronization rings and into engagement with the coupling rings in a well known manner.

The two side walls or flanks of the internal coupling teeth of the shift sleeve and the external teeth of the coupling rings each have a back tapered surface adjacent each side of their respective tips that provide a torque lock feature that also operates in a well known manner to maintain engagement until the shift sleeve is purposely shifted out of engagement.

Synchronizing arrangements such as those disclosed in the Oun patent are often used in applications where at least one of the coupling rings is an integral part of or fastened to a helical gear which as a practical matter has some end play. Because of this end play, the helical gear is shifted axially in one direction or the other when torque is transferred to the helical gear by a mating helical gear. This torque responsive shift results in an over engagement of the torque lock surfaces when torque is transferred in one direction and an under engagement of the torque lock surfaces when the torque is reversed.

SUMMARY OF THE INVENTION

An object of this invention is to provide a synchronizing arrangement that has a torque lock feature that accommodates end play of a helical gear used with the synchronizing arrangement.

Another object of this invention is to provide a synchronizing arrangement that has a torque lock feature wherein the shift sleeve and the clutch gear or coupling ring have cooperating teeth that are shaped to reduce variation in the engagement of the torque lock feature when the synchronizing arrangement is used with a helical gear that has end play.

Still another object of this invention is to provide a synchronizing arrangement that has a torque lock feature wherein the shift sleeve and the clutch gear have cooperating teeth that are shaped to provide more uniform engagement of the torque lock feature when the synchronizing arrangement is used with a helical gear that has end play and that shifts axially in opposite direction responsive to the direction of the torque transfer.

A feature of the invention is that the synchronizing arrangement has a torque lock feature comprising lock surfaces that are adjacent opposite sides of asymmetrical tips of the teeth bearing the torque lock surfaces.

Another feature of the invention is that the synchronizing arrangement has a torque lock feature comprising lock surfaces that are adjacent opposite sides of tips that have points or apexes that are offset from the center planes of the teeth bearing the torque lock surfaces.

Still another feature of the invention is that synchronizing arrangement has a clutch gear or coupling ring with teeth that have tips for engaging cooperating tips of the shift sleeve that have points or apexes that are offset from the respective center planes of the clutch gear teeth.

Still yet another feature of the invention is that the synchronizing arrangement has a clutch gear with teeth that have tips for engaging cooperating tips of the shift sleeve and back tapered side surfaces adjacent each side of the tips for engaging cooperating side surfaces of the shift sleeve to provide a torque lock feature wherein the tips of the clutch gear have points or apexes that are offset from the respective center planes of the clutch gear teeth so that the back tapered side surface on one side of the clutch gear teeth are axially displaced from the back tapered side surface on the other side of the clutch gear teeth.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
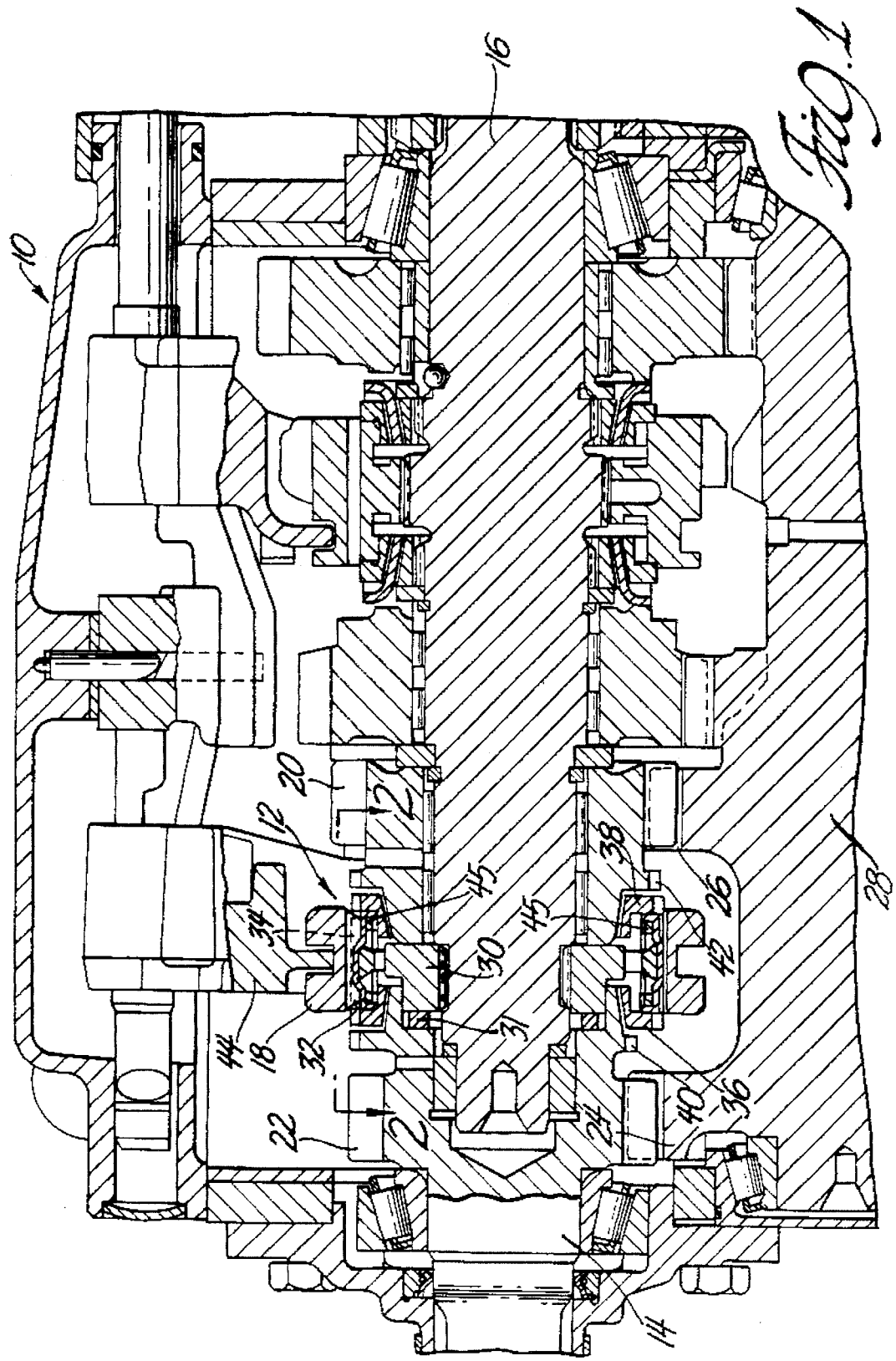
FIG. 1 is an axial cross section of a gear transmission equipped with a synchronizing arrangement in accordance with the invention.

Referring now to the drawing, FIG. 1 is an axial cross section of a gear transmission 10 equipped with a synchronizing arrangement of the invention that is generally indicated at 12.

The synchronizing arrangement 12 is a two-way synchronizer that is associated with an input shaft 14 and an output shaft 16 of the gear transmission 10. The gear transmission 10 is a synchromesh type transmission in which the input shaft 14 gear drives a counter shaft having intermediate gears that are in constant mesh or driving engagement with output gears that are rotatably mounted on the output shaft 16. These intermediate gears are selectively drivingly attached to the counter shaft by synchronizing arrangements such as the synchronizing arrangement 12.

The synchronizing arrangement 12 comprises a shift sleeve 18 which is shown in a neutral position in FIG. 1. The shift sleeve 18 is shifted to the left from the neutral position shown in FIG. 1 to couple the input shaft 14 to the output shaft 16 for direct drive. The shift sleeve 18 may also be shifted to the right from the neutral position shown in FIG. 1 to couple a helical gear 20 (that is rotatably mounted on the output shaft 16) to the output shaft 16. When the helical gear 20 is thus coupled, the output shaft 16 is driven by the input shaft 14 at a fixed reduced ratio via a helical gear train in constant mesh comprising an input or pinion gear 22 of the input shaft 14, intermediate gears 24 and 26 affixed to the countershaft 28 and the helical gear 20.

The operation of a synchromesh type gear transmission is well known and consequently the above brief description of the operation of the gear transmission 10 is sufficient for those skilled in the art to understand the invention.

The operation of a synchronizing arrangement is also well known so that the operation of the synchronizing arrangement 12 likewise need not be described in great detail and thus the following description is sufficient for those skilled in the art to understand the invention.

The synchronizing arrangement 12 comprises a guide hub 30 that is non-rotatably splined to an end portion of the output shaft 16 and located between the input gear 22 of the input shaft 14 and the helical output gear 20 rotatably mounted on the output shaft 16. The guide hub 30 is axially located on the output shaft 16 in an axially fixed position between a shoulder of the output shaft 16 and a thrust bearing 31 that is disposed between the guide hub and a thrust surface of the input gear.

The shift sleeve 18 has internal splines 32 that engage external splines 34 of the guide hub 30 so that the shift sleeve 18 does not rotate with respect to the guide hub 30 but does slide back and forth on the guide hub 30 in the axial direction.

The synchronizing arrangement 12 further comprises blocker rings 36 and 38 on either side of the guide hub 30 and shift sleeve 18 that cooperate with respective clutch gears 40 and 42 that are formed as an integral part of the helical input gear 22 and the helical output gear 20 respectively. Alternatively the clutch gears 40 and 42 may be separate pieces that are welded or otherwise suitably secured to the gears 22 and 20.

The blocker rings 36 and 38 also include conical bores that cooperate with external conical surfaces of the respective clutch gears 40 and 42 to provide friction cone clutches.

Figure 2:
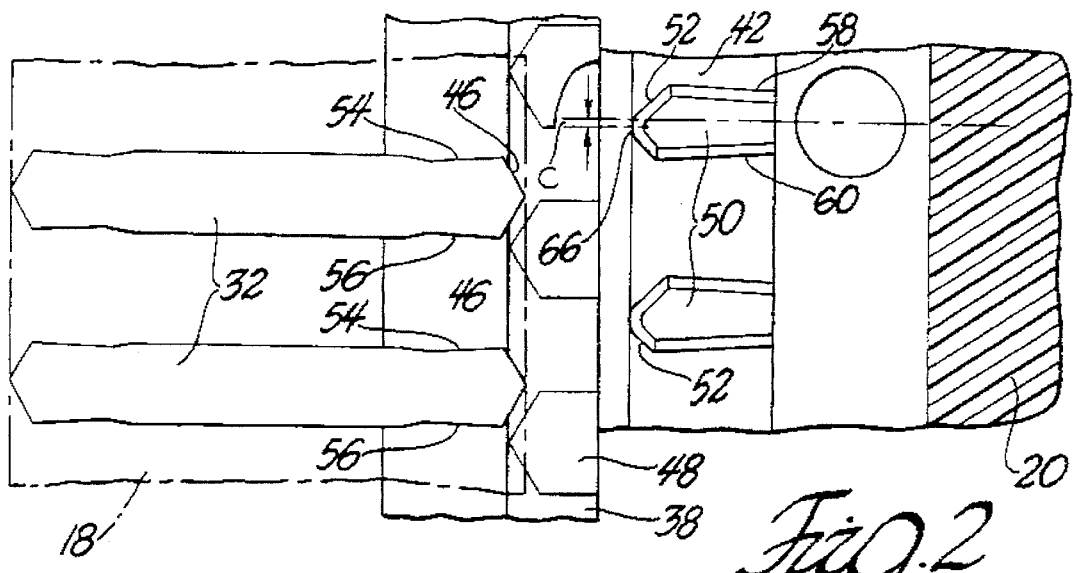
FIG. 2 is a section taken substantially along the line 2—2 of FIG. 1 showing details of the synchronizing arrangement.

Basically the synchronizer arrangement 12 operates as follows. In order to engage the helical gear 20 to the output shaft 16, the shift sleeve 18 is manually shifted by means of a yoke 44 to the right from the neutral position shown in FIGS. 1 and 2. As the shift sleeve 18 shifts to the right, struts 45 releasably carried by the shift sleeve 18 push the blocker ring 38 to the right so that the cone clutch formed by the confronting conical surfaces of the blocker ring 38 and the clutch gear 42 engages. Engagement of the cone clutch holds the blocker ring 38 in a blocking position with respect to the shift sleeve blocker ring 38 and the clutch gear 42 as shown in FIG. 2. After the cone clutch is engaged, the shift sleeve 18 continues to the right until the tip ends 46 of the internal splines 32 of the shift sleeve 18 engage the tip ends of the external gear teeth 48 of the blocker ring 38 on the right hand side of the shift sleeve 18. This stops the shift sleeve 18 until the speed of the clutch gear 42 (and helical gear 20) is the same as that of the blocker ring 38 and the shift sleeve 18. When the speed equalizes the shift sleeve 18 resumes shifting to the right and indexes the blocker ring 38 into alignment with the internal splines 32 of the shift sleeve 18 so that the internal splines 32 pass between the external gear teeth 48 of the blocker ring 38 and engage the tips 52 of the gear teeth 50 of the clutch gear 42. The cooperating tips 46 and 52 then guide the internal splines 32 into engagement with the external gear teeth 50 of the clutch gear 38 as shown schematically in FIG. 3. The internal splines 32 and external gear teeth 50 are then held in engagement by a torque lock feature that is more fully explained below.

Figure 3:
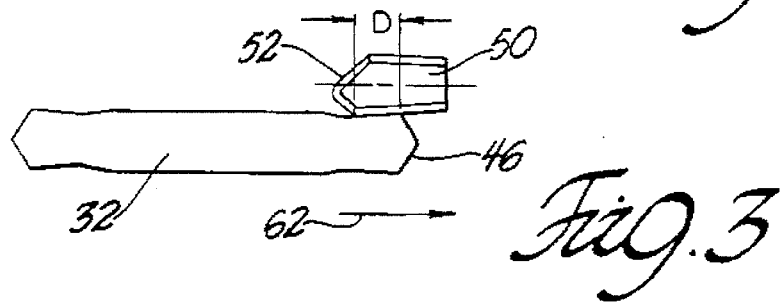
FIG. 3 is a schematic representation of FIG. 2 showing the synchronizing arrangement engaged when the gear transmission is being driven by an engine.
Figure 4:
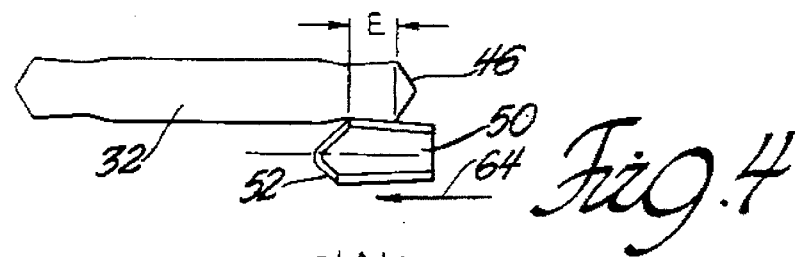
FIG. 4 is a schematic representative of FIG. 2 showing the synchronizing arrangement engaged when the gear transmission is driven by a coasting vehicle.

FIG. 3 shows a driving situation where the shift is made when the input shaft 14 is driving the output shaft 16 that is, when an engine (not shown) is driving the gear transmission 10. FIG. 4 shows the opposite or coasting situation where the shift is made when the input shaft 14 is being driven by the output shaft 16, that is when the gear transmission 10 is being driven by a coasting vehicle. In this instance, the opposite side walls or flanks of the internal splines 32 and external gear teeth 50 engage as shown schematically in FIG. 4.

In order to couple the input shaft 14 directly to the output shaft 16, the shift sleeve 18 is manually shifted by means of the yoke 44 to the left from the neutral position shown in FIGS. 1 and 2 with the same sequence of events occurring on the left hand side of the shift sleeve 18. For a more detailed explanation of the shifting events, recourse may be had to U.S. Pat. No. 5,211,068 issued to Ralph J. Spitale and Lance M. Tobey May 18, 1994 and assigned to Borg-Warner Automotive, Inc. or to SAE Paper No. 68008 on Manual Transmission Synchronizers by Socin and Walters published January 1968, both of which are hereby incorporated by reference.

Figure 5:
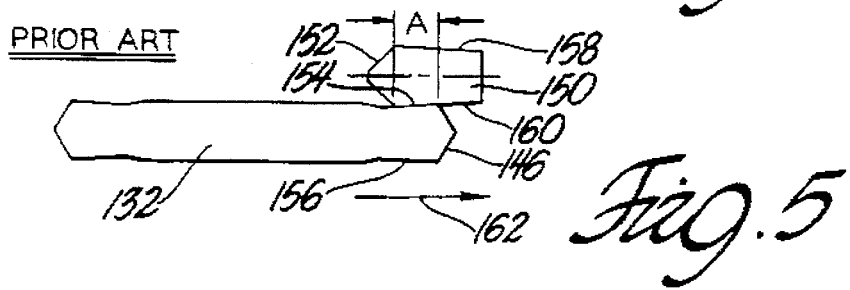
FIGS. 5 and 6 are schematic representations similar to FIGS. 3 and 4 respectively showing a prior art synchronizing arrangement in the same respective operative conditions.
Figure 6:
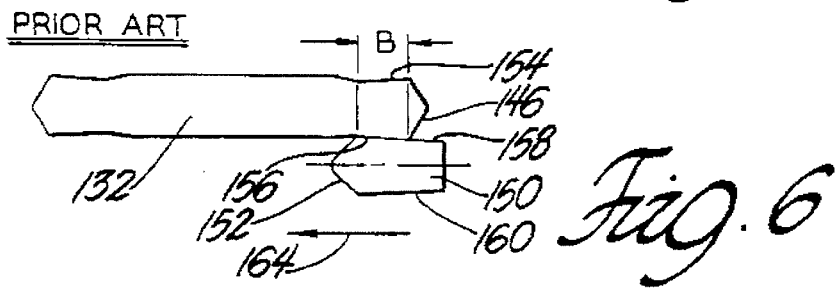

Referring now to FIGS. 5 and 6, these figures show the torque locked engagement of the cooperating internal splines 132 and external gear teeth 150 of a prior art synchronizing arrangement having a torque lock feature such as that disclosed in U.S. Pat. No. 5,083,993 that is discussed above. The external teeth of the blocker ring (sometimes referred to at the synchronizer ring) have been omitted for clarity.

In these prior art arrangements the cooperating tips 146 and 152 of the internal splines 132 and the external gear teeth 150 are symmetrical and the back tapered torque lock surfaces that provide the torque lock feature are also symmetrical. In other words, the tips 146 and 152 each have equally and oppositely angled chamfers that intersect at a central point or apex that bisects the associated internal spline or external gear tooth. Similarly the torque lock surfaces 154 and 156 of the internal splines 132 have the same length and equal (but opposite) taper angles while the torque lock surfaces 158 and 160 of the external gear teeth 150 also have the same length and equal (but opposite) taper angles as shown in FIGS. 5 and 6.

This symmetrical arrangement of the prior art torque lock has a drawback when the synchronizer arrangement is used in conjunction with a helical gear that has end play when it is rotatably mounted on a shaft or the like. For instance when the gear teeth 150 are part of a clutch gear that is either attached to or an integral part of a helical gear such as the helical gear 20 shown in FIGS. 1 and 2, the gear teeth 150 shift axially in one direction or the other depending upon the direction of torque transfer to the helical gear 20. Thus when the shift sleeve carrying the internal splines 132 is shifted in a driving situation, that is, when the input shaft 14 is driving the output shaft 14, the helical gear 20 is driven to the right or away from the shift sleeve as indicated by the arrow 162 in FIG. 5 to take up any end play. Of course, this also drives the external gear teeth 150 of the clutch gear that is attached to or an integral part of the helical gear 20 to the right. This results in an underengagement of the torque lock surfaces 156 and 160 which is indicated by the overlap distance "A" in FIG. 5.

On the other hand, when the shift sleeve carrying the internal splines 132 is shifted in a coasting situation, that is, when the input shaft 14 is being driven by the output shaft 14, the helical gear 20 is driven to the left or toward the shift sleeve as indicated by the arrow 164 in FIG. 6 to take up any end play. As indicated above, this also drives the external gear teeth 150 of the clutch gear that is attached to or an integral part of the helical gear 20 to the left. This results in an over engagement of the torque lock surfaces 156 and 158 which is indicated by the overlap distance "B" in FIG. 6. Distance "B" is in effect distance "A" plus the end play of the helical gear 20.

The synchronizing arrangement 12 of this invention has a torque lock feature that accommodates end play of the helical gear 20 and reduces variation in the engagement of the torque lock surfaces as will now be more fully explained in connection with FIGS. 2, 3 and 4.

FIG. 2 shows the cooperating internal splines 32 and the external gear teeth 50 of the invention prior to engagement while FIGS. 3 and 4 show the torque locked engagement of these cooperating internal splines 32 and external gear teeth 50 under different operating circumstances. The external teeth 48 of the blocker ring 38 (sometimes referred to as a synchronizer ring) have been omitted for clarity in FIGS. 3 and 4.

The tips 46 and the back tapered torque lock surfaces 54 and 56 of the internal splines 32 are symmetrical as in the case of the prior art internal splines discussed above. However, the cooperating tips 52 and the back tapered torque lock surfaces 58 and 60 of the external gear teeth 50 are asymmetrical to improve engagement of the torque lock surfaces when the synchronizing arrangement 12 is used with a helical gear such as the helical gear 20 that has end play.

More specifically, the tips 52 each have equally and oppositely angled chamfers that intersect at a point or apex 66 that is offset from the center plane of the associated external gear tooth 50 by a distance "C" toward the coasting side of the external gear tooth 50. This results in the torque lock surfaces 58 on one side of the external gear teeth 50 that are axially displaced in a direction away from the shift sleeve 18 and torque lock surfaces 60 on the other side of the external gear teeth 50 that are axially displaced in a direction toward the shift sleeve 18 in comparison to the prior art symmetrical arrangements.

This asymmetrical arrangement has the advantage of reducing variation in engagement of the torque lock surfaces when the synchronizing arrangement 12 is used with a helical gear such as the helical gear 20 that has end play and thus shifts axially in opposite directions responsive to the direction of torque transfer as explained above.

When the shift sleeve 12 carrying the internal splines 32 is shifted in a driving situation, that is, when the input shaft 14 is driving the output shaft 14, the external gear teeth 50 and the helical gear 20 are still driven to the right or away from the shift sleeve 18 as indicated by the arrow 62 in FIG. 3 to take up any end play. However this results in an engagement of the torque lock surfaces 54 and 60 which is indicated by the overlap distance "D" in FIG. 3 and which is greater than the overlap distance "A". This improved engagement in comparison to the under engagement of the prior art shown in FIG. 5 is due to the fact that the torque lock surface 60 is axially displaced toward the shift sleeve 18 in comparison to the prior art symmetrical arrangement and thereby accommodates the shift of the clutch gear 42 away from the shift sleeve 18 to take up the end play of the helical gear 20.

On the other hand, when the shift sleeve 12 carrying the internal splines 32 is shifted in a coasting situation, that is, when the input shaft 14 is being driven by the output shaft 14, the external gear teeth 50 and the helical gear 20 are driven to the left or toward the shift sleeve 18 as indicated by the arrow 64 in FIG. 4 to take up any end play. This results in an engagement of the torque lock surfaces 54 and 58 which is indicated by the overlap distance "E" in FIG. 4 and which is less than the overlap distance "B". This improved engagement in comparison to the over engagement of the prior art shown in FIG. 6 is due to the fact that the torque lock surface 58 is axially displaced away the shift sleeve 18 in comparison to the prior art symmetrical arrangement thereby accommodating the shift of the clutch gear 40 toward the shift sleeve 18 to take up the end play.

Thus the engagement of the torque lock surfaces of the invention are more uniform than in the case of the prior art symmetrical arrangements. Moreover, an ideal condition is possible when the engagement of the torque lock surfaces in the drive and coast directions is equalized by selecting the offset "C" so that the torque lock surfaces 58 on the coast side of the external gear teeth 50 are axially displaced from the torque lock surfaces 60 on the drive side of the external gear teeth 50 in a direction away from the shift sleeve 18 by an amount that is equal to the installed end play of the helical gear 20.

As indicated above, the shift sleeve 18 may also be shifted to the left to engage the clutch gear 40. Thus the clutch teeth of the clutch gear 40 can also be shape like the clutch teeth 50 to improve the torque lock surface engagement of the internal splines 32 of the shift sleeve 18 with the clutch teeth of the clutch gear 40.

While the above example describes a preferred synchronizing arrangement where the tips and torque lock surfaces of the interior splines 32 are symmetrical and the tips and torque lock surfaces of the external gear teeth 50 are asymmetrical, it is also possible to use other arrangements. For instance the tips and torque lock surfaces of the interior splines can be made asymmetrical or the tips and torque lock surfaces of both the interior splines and the external gear teeth can be made asymmetrical to achieve the desired results of equalizing or at least reducing variation in the engagement of the torque lock surfaces due to end play.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A synchronizing arrangement for use with helical gears comprising a shift sleeve having teeth, a clutch gear having teeth engageable with the teeth of the shift sleeve and a torque lock that includes torque lock surfaces on each side of the teeth of the shift sleeve engaging cooperating torque lock surfaces on each side of the teeth of the clutch gear characterized in that the torque lock surfaces on one side of the teeth of the clutch gear or the shift sleeve are axially displaced from the torque lock surfaces on the opposite side of the aforesaid teeth of the clutch gear or the shift sleeve.

2. The synchronizing arrangement as defined in claim 1 wherein the teeth of the shift sleeve and the teeth of the clutch gear have tips that engage to guide the teeth of the shift sleeve into engagement with the teeth of the clutch gear and wherein the teeth of the aforesaid clutch gear or shift sleeve have tips that are asymmetrical.

3. The synchronizing arrangement as defined in claim 1 wherein the teeth of the shift sleeve and the teeth of the clutch gear have tips that engage to guide the teeth of the shift sleeve into engagement with the teeth of the clutch gear and wherein the teeth of the aforesaid clutch gear or shift sleeve have tips that have points or apexes that are offset from a center plane of their respective teeth.

4. The synchronizer arrangement as defined in claim 1 wherein the torque lock surfaces of the teeth of the shift sleeve engage the cooperating torque lock surfaces of the teeth of the clutch gear with a substantially constant overlap when the torque lock is engaged irrespective of the torque direction.

5. The synchronizing arrangement as defined in claim 1 wherein the torque lock surfaces on one side of the teeth of only the clutch gear or the shift sleeve are axially displaced from the torque lock surfaces on the opposite side.

6. The synchronizing arrangement as defined in claim 1 wherein the torque lock surfaces of the teeth of the shift sleeve are symmetrical.

7. The synchronizing arrangement as defined in claim 1 wherein the torque lock surfaces of the teeth of the clutch gear are symmetrical.

8. A synchronizing arrangement for use with helical gears having end play comprising a shift sleeve having teeth, a clutch gear having teeth engageable with the teeth of the shift sleeve and a torque lock that includes back tapered torque lock surfaces on each side of the teeth of the shift sleeve engageable with cooperating back tapered torque lock surfaces on each side of the teeth of the clutch gear characterized in that the teeth of the shift sleeve and the teeth of the clutch gear have tips that engage to guide the teeth of the shift sleeve into engagement with the teeth of the clutch gear and in that the teeth of one of the clutch gear and the shift sleeve have tips that have points or apexes that are offset from center planes of their respective teeth so that the back tapered torque lock surfaces on one side of the aforesaid teeth are axially displaced from the back tapered torque lock surfaces on the opposite side of the aforesaid teeth.

9. The synchronizing arrangement as defined in claim 8 wherein the tips of the clutch gear have points or apexes that are offset from the center planes of their respective teeth so that the back tapered side surface on one side of the teeth are axially displaced from the back tapered side surface on the other side of the teeth.

10. The synchronizing arrangement as defined in claim 8 wherein the tips of the shift sleeve have points or apexes that are offset from the center planes of their respective teeth so that the back tapered side surface on one side of the teeth are axially displaced from the back tapered side surface on the other side of the teeth.

11. The synchronizer arrangement as defined in claim 8 wherein the torque lock surfaces of the teeth of the shift sleeve engage the cooperating torque lock surfaces of the teeth of the clutch gear with a substantially constant overlap when the torque lock is engaged irrespective of the torque direction.

12. The synchronizing arrangement as defined in claim 8 wherein the teeth of only one of the clutch gear and the shift sleeve have points or apexes that are offset from the center planes of their respective teeth so that the back tapered torque lock surfaces on one side of the teeth of only the clutch gear on the shift sleeve are axially displaced from the torque lock surfaces on the opposite side.

13. The synchronizing arrangement as defined in claim 8 wherein the torque lock surfaces of the teeth of the shift sleeve are symmetrical.

14. The synchronizing arrangement as defined in claim 8 wherein the torque lock surfaces of the teeth of the clutch gear are symmetrical.

* * * * *